United States Patent
Shirogane et al.

(10) Patent No.: US 7,680,953 B2
(45) Date of Patent: Mar. 16, 2010

(54) COMPUTER SYSTEM, STORAGE DEVICE, MANAGEMENT SERVER AND COMMUNICATION CONTROL METHOD

(75) Inventors: Tetsuya Shirogane, Odawara (JP); Kenichi Tsukiji, Yokohama (JP); Tetsuya Ohno, Zama (JP); Naoto Matsunami, Hayama (JP)

(73) Assignee: Hitachi, Ltd., Tokyo (JP)

( * ) Notice: Subject to any disclaimer, the term of this patent is extended or adjusted under 35 U.S.C. 154(b) by 841 days.

(21) Appl. No.: 11/359,377

(22) Filed: Feb. 23, 2006

(65) Prior Publication Data
US 2007/0112974 A1 May 17, 2007

(30) Foreign Application Priority Data
Nov. 15, 2005 (JP) .............................. 2005-330753

(51) Int. Cl.
*G06F 15/173* (2006.01)
(52) U.S. Cl. .................. 709/239; 709/211; 709/217; 709/223; 709/226; 709/245; 711/200; 370/389
(58) Field of Classification Search ......... 709/238–240, 709/211, 217, 223, 226–227, 245; 370/229; 711/200
See application file for complete search history.

(56) References Cited

U.S. PATENT DOCUMENTS

| | | | | |
|---|---|---|---|---|
| 6,199,112 | B1* | 3/2001 | Wilson | 709/227 |
| 6,400,730 | B1* | 6/2002 | Latif et al. | 370/466 |
| 2004/0049553 | A1* | 3/2004 | Iwamura et al. | 709/213 |
| 2005/0114693 | A1* | 5/2005 | Mimatsu et al. | 713/200 |
| 2005/0193181 | A1* | 9/2005 | Kaneda et al. | 711/162 |
| 2005/0210144 | A1* | 9/2005 | Kumagai et al. | 709/229 |
| 2005/0216668 | A1* | 9/2005 | Kobayashi et al. | 711/118 |
| 2006/0004876 | A1 | 1/2006 | Matsunami et al. | |
| 2006/0064466 | A1* | 3/2006 | Shiga et al. | 709/214 |

FOREIGN PATENT DOCUMENTS

| | | |
|---|---|---|
| JP | 05-346898 | 12/1993 |
| JP | 2004-129287 | 4/2004 |

* cited by examiner

*Primary Examiner*—Wing F Chan
*Assistant Examiner*—Hitesh Patel
(74) *Attorney, Agent, or Firm*—Antonelli, Terry, Stout & Kraus, LLP.

(57) ABSTRACT

The invention provides a communication control method for switching paths at high speed to switch storages without a special path switching means in a host computer, without stopping an application or without changing settings, and a device for realizing the same. The present computer system comprises a host computer 20, a storage devices 10 connected via a network 30 to the host computer 20, and a name server 40, wherein the host computer 20 has a function to search for an alternate path when a defect is discovered in a path used for connection with the storage 10, and the storage device 10 has a target communicating with the host computer 20 through a port, a registration change means for changing a registered address associated with the registration of a migration source target registered in the name server 40 to an address of a migration destination port, and a means for disconnecting all communication means established with the migration source target subsequent to the registration change process.

16 Claims, 14 Drawing Sheets

FIG.4

INITIATOR INFORMATION MANAGEMENT TABLE

1000

| index | initiator ID (iSCSI Name) | Address | Authentication information |
|---|---|---|---|
| 10A | com.hitachi.server-001 | 192.168.0.10 | CHAP, secret=abcdef |
| 10B | com.hitachi.server-002 | 192.168.0.20 | none |

TARGET INFORMATION MANAGEMENT TABLE

1100

| index | LU MAPPING | Target ID (iSCSI Name) | Address | INITIATOR IN COMMUNICATION | MIGRATION STATE | MIGRATION DESTINATION Address | MIGRATION DESTINATION LU |
|---|---|---|---|---|---|---|---|
| 20A | 6 | com.hitachi.raid-001 | 192.168.0.100 | 10A | Data moving | 192.168.0.110 | 1 |
| 20B | 7 | com.hitachi.raid-002 | 192.168.0.101 | 10B | Not migrate | N/A | N/A |

1110
1120

COMPUTER SYSTEM, STORAGE DEVICE, MANAGEMENT SERVER AND COMMUNICATION CONTROL METHOD

The present application is based on and claims priority of Japanese patent application No. 2005-330753 filed on Nov. 15, 2005, the entire contents of which are hereby incorporated by reference.

BACKGROUND OF THE INVENTION

1. Field of the Invention

The present invention relates to a computer system, a host transmission iSCSI path switching method and a storage device utilizing the same, and more specifically, relates to a communication control method for accessing storage, a storage device, a computer system and a memory medium storing a communication control program.

2. Description of the Related Art

Heretofore, communication between a server device (hereinafter referred to as "host") and a storage device (hereinafter referred to as "storage" or "storage system") was realized through a fibre channel (hereinafter referred to as "FC") by connecting the devices via a dedicated network. This network dedicated to connecting storages is called a storage area network (hereinafter referred to as "SAN"). A SAN utilizing FC as network control protocol is especially called FC-SAN. In an FC-SAN, protocols such as SCSI (small computer systems interface) and SBCCS (single byte command code set) are used as higher protocols of FC for controlling the storages.

On the other hand, it is recently becoming popular to utilize TCP/IP which is a network technology instead of FC. A special protocol technology for utilizing SCSI as a higher protocol of TCP/IP is called an iSCSI (internet SCSI). The TCP/IP and iSCSI have been standardized by IETF (the Internet Engineering Task Force). The TCP/IP is further defined as TCP (transmission control protocol) and IP (internet protocol). In general, communication control (protocol processing) is performed hierarchically in a network. For example, the protocol layer for processing TCP is called a TCP layer, and the protocol layer for processing IP is called an IP layer.

FIG. 15 shows the relationship between protocol layers of devices performing iSCSI communication and the transmitted and received data. The host 20 and the storage system 10 are connected via a network 30. The protocol hierarchy of the devices performing iSCSI communication is composed of an application layer 320, a SCSI layer 300, an iSCSI layer 301, a TCP layer 302, an IP layer 303 and a MAC layer 304. The MAC layer 304 is also called a media access control layer, which normally utilizes an Ethernet (registered trademark) or a gigabit Ethernet (registered trademark). The data length handled by each protocol layer differs, and header information and the like are added to the data. The protocol hierarchy is defined from the higher protocol downward as the application layer 320, the SCSI layer 300, the iSCSI layer 301, the TCP layer 302, the IP layer 303 and the MAC layer 304.

In the host 20, the application layer 320 stores application softwares (such as a database, an image processing software, a design support software, a word processor and a spreadsheet software; hereinafter referred to as "application").

In the storage system 10, the application layer 320 is a memory device, which stores data received from the host 20 or reads the stored date and transmits the same to the host 20 based on the instructions from the host 20. SCSI read instructions and write instructions or the like are used as instructions from the host 20, but the detailed descriptions thereof are omitted in the present specification, and only the general outline thereof is described. That is, the application 320 of the host 20 transmits data from the data 310 stored in the memory device via the SCSI layer 300, the iSCSI layer 301, the TCP layer 302, the IP layer 303, the MAC layer 304 and through the network 30 to the storage system 10. Upon receiving this data, the storage 10 stores the data 310 via the MAC layer 304, the IP layer 303, the TCP layer 302, the iSCSI layer 301 and the SCSI layer 300 in the memory device (340). The application 320 of the host 20 transmits the SCSI instructions to the memory device in the same path.

The memory device having received the read instruction of SCSI transmits the stored data 310 via the SCSI layer 300, the iSCSI layer 301, the TCP layer 302, the IP layer 303, the MAC layer 304 and via the network 30 to the host 20. Upon receiving the data, the host 20 transmits the data 310 via the MAC layer 304, the IP layer 303, the TCP layer 302, the iSCSI layer 301, and the SCSI layer 300 to the application 320 (350).

Upon operating a storage, it becomes necessary to expand the storage capacity when the information to be stored and maintained is increased. Further, along with the increase in access quantity to the data, it is effective to replace the storages with storages having higher access processing abilities, or to disperse the access processing load among devices by moving a portion of the data to a new storage. This is caused for example in a storage operated in a company having an increasing scale of business, having increasing numbers of customers and employees, by which the information handled in the company and the access quantity are increased greatly.

Moreover, it is considered that more malfunctions occur in aged storages due to physical deterioration of the drives and the like. Thus, it is necessary to transfer data to a separate storage to have the data stored continuously in a new storage. Demands for such continuous storage of data have increased with the recent trend of making long-term storage of business data such as emails obligatory.

Since the IP network has a drawback in that communication thereof is unstable compared to the FC, the iSCSI requires communication paths (hereinafter referred to as paths) to be switched for load dispersion or failure control, similar to the case in conventional networks.

In a conventional storage, when it is necessary to expand the storage capacity, replace the storage or migrate the data of an operating storage, the communication counterpart storage is switched and so the communication path is switched, and the information on the storage in the application is changed. In other words, the application must be stopped, and the host setup must be changed before restarting operation of the application.

The conventional methods for switching paths are the following:

(1) FC path switch; wherein two paths are prepared in advance, and the switching from address 1 to address 2 is performed; and (2) IP network path switch; wherein the operation of a migration source port is stopped, and the IP address is taken over to the migration destination.

However, if these methods are to be applied to the IP-SAN, they each have drawbacks in that (1) a path switching software must be operated in the host and two paths must be prepared in advance; and (2) the host performs reconnection after timeout, and the switching time may exceed several seconds depending on the timeout of the network, during which time the host application is stopped.

Japanese Patent Application Laid-Open Publication No. 2004-129287 (claims etc.) (patent document 1) discloses a means for realizing method (2) at high speed, and Japanese Patent Application Laid-Open Publication No. 05-346898 (claims etc.) (patent document 2) discloses an art related thereto. Patent document 1 discloses an art of enabling the TCP/IP layer and the user application program to be unaware of redundancy, by enabling the port control means that performs address translation between the MAC layer and the IP layer to transfer the information on the MAC layer (MAC address) recognized by the IP layer before the route change to the IP layer even when the redundant portion of the MAC layer is switched.

In the art disclosed in patent document 1, the MAC address is changed to the communication destination address of the migration source by a redundant software or path switch software. The application is unaware of the redundancy, and continues communication using the same TCP connection. Even when the TCP path is switched, the TCP connection is maintained and the application is not influenced by the switching. Further, patent document 2 discloses an art of establishing a connection between the client and server, and if a communication error occurs on the connection during data communication, detects the error to automatically release the connection when the error occurs, outputs a connection establishment request and establishes a new connection.

However, the prior art does not disclose the art of switching paths via a means at high speed and without the application being aware of the switch and without the execution of a path switch means in the host. In other words, according to patent document 1, the host requires a path control software, and a plurality of connections must be established in advance. According to patent document 2, the path failure recovery is performed at high speed, but there is no disclosure of an art of changing the connection destination of the paths. In other words, it does not disclose the art of disconnecting paths from the storage with the aim to switch paths or switch targets.

SUMMARY OF THE INVENTION

In consideration of the above problems, the present invention aims at providing a communication control method for switching paths at high speed to switch storages without a special path switching means in the host, without stopping the application and without changing settings, a device for realizing the same, and a memory medium storing the program for realizing the same.

In order to solve the above problems, the communication control technology of the present invention changes the IP address of a migration source target registered in an iSNS (internet storage name service) server which is the iSCSI name server to the IP address of a migration destination target, and disconnects the communication between the migration source target and the host at the timing of migrating the target or the communication path. Thus, the switching of targets and switching of paths are realized at high speed without the application being aware, by utilizing a failure recovery function of the host.

The present invention provides a computer system comprising one or more host computers, one or more storage devices connected via a network with the host computer, and a name server, wherein the host computer has a function to search for an alternate path when a defect is discovered in a path used between the storage, and the storage device has a target communicating via a predetermined communication means with the host computer through a port, a registration change means for changing a registered address associated with the registration of a migration source target registered in the name server to an address of a migration destination port, and a means for disconnecting all communication means established with the migration source target subsequent to the registration change process.

According to the present invention, the targets can be switched in a short time in an IP-SAN without the host application being aware of the switch and without requiring a special-path switch means in the host. The present invention provides an IP storage capable of realizing storage capacity expansion, storage replacement, data migration and switching of communication paths in a storage in operation without stopping applications.

BRIEF DESCRIPTION OF THE DRAWINGS

FIG. 4 is an explanatory view showing an initiator information management table according to embodiment 1;

FIG. 5 is an explanatory view showing a target information management table according to embodiment 1;

DETAILED DESCRIPTION OF THE PREFERRED EMBODIMENTS

The preferred embodiments for carrying out the present invention will be described.

The preferred embodiments of the computer system, the storage device, the management server and the communication control method according to the present invention will now be described with reference to the drawings.

Embodiment 1

According to a first embodiment of the present invention, the migration source storage carries out an iSNS register change and then disconnects the connection to switch paths in order to realize data migration between storages. The first embodiment is further characterized in that the migration source target executes the LU copy process in the background while processing accesses from the host, and when the process is completed, executes target migration of the host.

[System Configuration]

Figure 1:
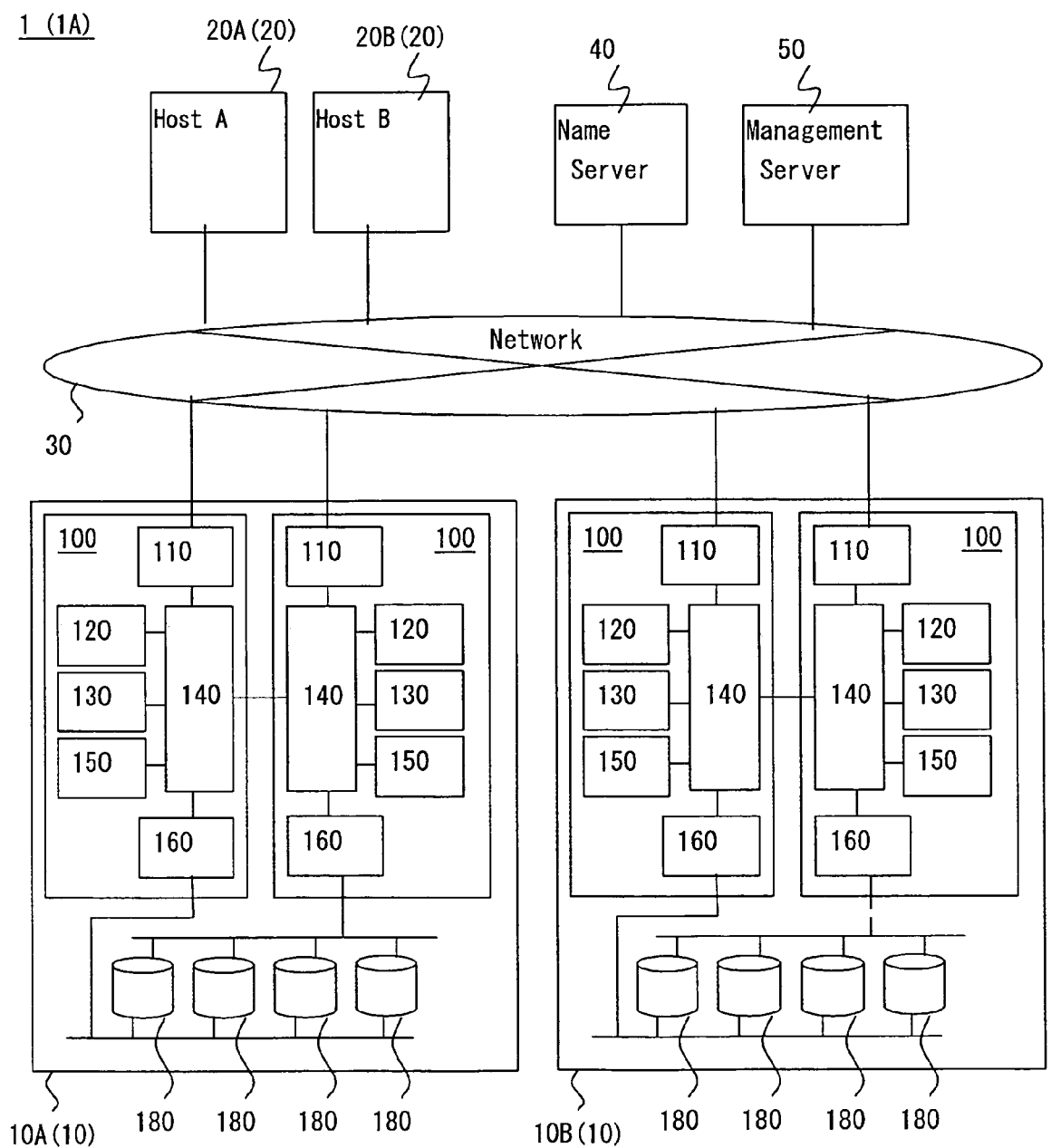
FIG. 1 is an explanatory view showing a hardware configuration of a computer system 1 according to a first embodiment.

FIG. 1 is an explanatory view showing the hardware (hereinafter referred to as H/W) configuration of a computer system 1 (1A) according to the first embodiment of the present invention. In the computer system 1 (1A) of the present embodiment, a storage system 10 (storage 10A and storage 10B), a host computer 20 (host 20A and host 20B, hereinafter may be simply referred to as host), a name server 40 and a management server 50 are connected to a network 30. In the present computer system, data is transmitted and received between the storage system 10 and the host 20 via the network 30. The storage system is composed of more than one storage device, but in the following description, the storage system and the storage device may not be distinguished, and simply referred to as storage.

The host 20 sends data write instructions and read instructions to the storage. This is performed using write instructions and read instructions of an SCSI command which is a higher protocol of iSCSI. Further, the host 20 is equipped with a function to search for an alternative path when a malfunction is discovered in the path set between the storage.

The storage system 10 is composed of storage controllers 100 and memory devices 180. The storage system 10 has a plurality of storage controllers 100, and if target information (target identifier and address described in detail later) of a plurality of controllers are set in advance in the host 20, the communication with the host 20 can be performed via the plurality of controllers.

The memory device 180 is normally composed of a plurality of disk drive devices to which the data subjected to write instruction from the host is finally stored.

The storage controller 100 has a network port 110. The network port 110 normally includes a physical port connected via a high speed IP interface such as a gigabit Ethernet (registered trademark) to the network 30. Though not illustrated, the network port can include a transmission buffer for temporarily storing transmission data and a receive buffer for temporarily storing received data. The network port is hereinafter simply referred to as port.

Moreover, the storage controller 100 includes a processor 120, a control memory 130 for storing various control information, a cache memory 150, and a back end interface 160 connected to the memory device 180 and performing input/output of data. The storage controller 100 further includes a data controller 140 for carrying out data transfer control on the storage controller 100.

The name server 40 provides a name server function called an "iSNS" in iSCSI. The iSNS itself is a client-server type service, wherein the iSNS being the name server has the functions of a server and the iSCSI initiator and the target has the functions of an iSNS client. The iSNS name server 40 stores information of the devices on the IP-SAN to a database within the iSNS (not shown), and provides a naming service that performs iSNS database inquiry based on the demands from the iSNS clients.

The name server 40 has the functions of an iSNS server for managing the identifiers of the iSCSI initiator and iSCSI target (iSCSI name) and address information (IP address). The name server is hereinafter referred to as iSNS server.

The management server 50 has the functions for managing the storage 10. In other words, the management server performs settings and management of the ports, targets and LUs. It also provides instructions related to data migration as described in detail later. The communication protocol between the management server and the storage 10 can be realized for example by adopting a unique protocol, by using the unused area of the SCSI command or by utilizing a TEXT negotiation of the iSCSI, but the details thereof are omitted since they are not essential to the present invention.

Further, although not shown in the drawing, the server 20, the name server 40 and the management server 50 are computers having processors, memory devices and input/output devices, respectively.

According to the present embodiment, the target being accessed by the host 20 is migrated from storage 20A to storage 20B. The details of the control are described in detail later.

Figure 2:
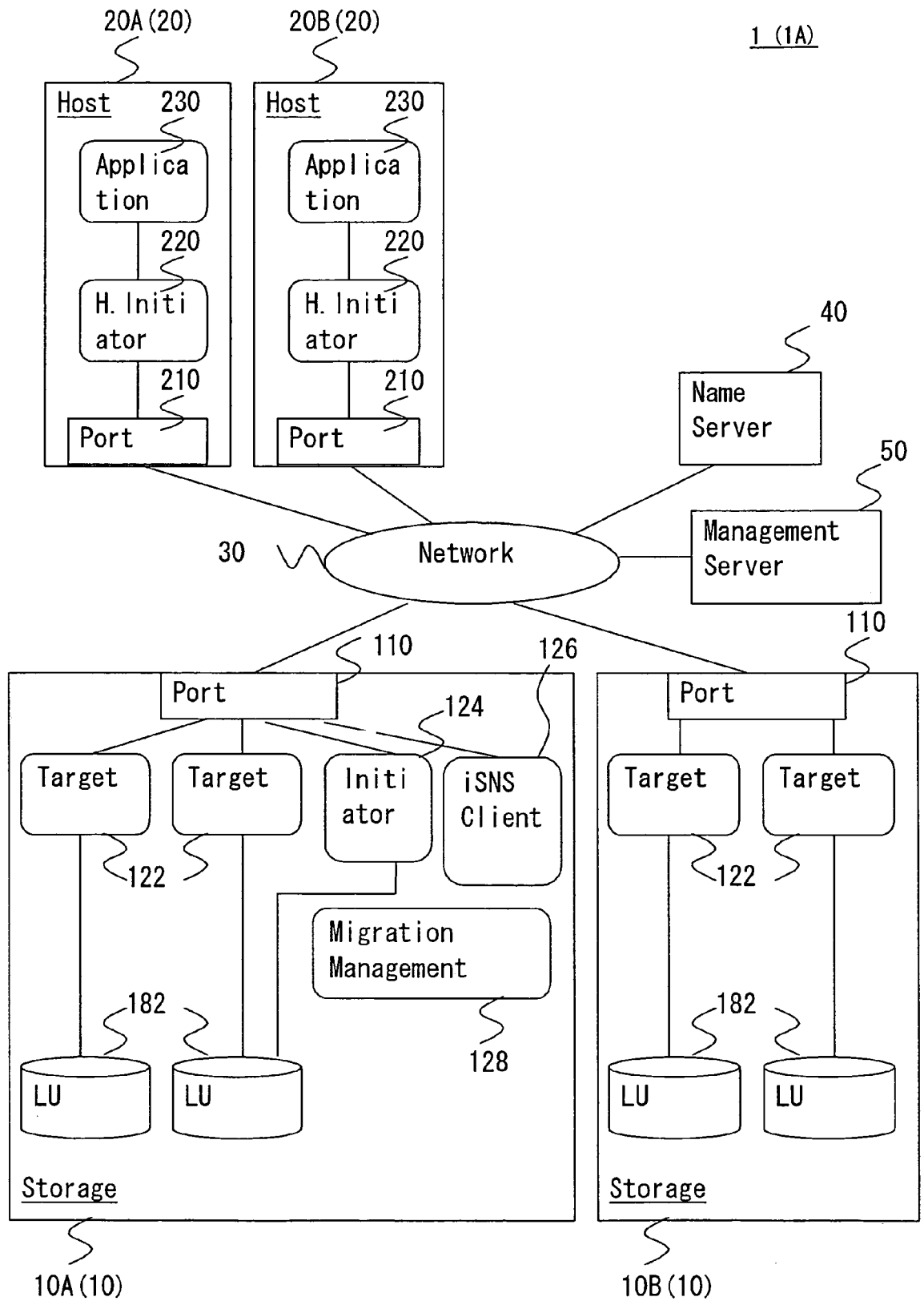
FIG. 2 is an explanatory view showing a module configuration of a computer system 1A according to embodiment 1.

FIG. 2 is an explanatory view showing the module configuration of the computer system 1 (1A) according to the first embodiment. Each server 20 has a network port 210, and operates on a processor not shown an initiator function 220 for realizing the functions of an iSCSI initiator and application 230.

The iSCSI initiator function 220 issues SCSI write instructions, read instructions and other control instructions to the target being the object of the access based on the requests from the application 230. The transmission from the initiator to the target and the reception from the target to the initiator are performed via port 210.

On the processor 120 of the storage system 10A are operated a target function 122, an initiator function 124, an iSNS client function 126 and a data migration management function 128 for managing data migration.

The target function 122 executes read/write of data on the LU (logical unit) defined on the memory device 180 based on the SCSI command received via port 110 as iSCSI command from the initiator function 220 of the host. Normally, multiple LUs are defined on the storage 10, which are identified by LUNs (LU numbers) according to their positions in the storage 10.

According to iSCSI, a plurality of targets can exist for a single physical port. It is also possible to physically use plural ports as a single path with different targets.

Each iSCSI node (iSCSI initiator and iSCSI target) has a different iSCSI name, and the initiator identifies the target to be accessed by the iSCSI name.

The individual target function has a mapping function for mapping the iSCSI names, ports and LUs. Moreover, the target function includes initiator authentication information for restricting the initiator to be connected, and includes a function to deny login of the initiator having failed to be authenticated.

The operation of the initiator function 124 is controlled by the data migration management function to copy the LU as described in detail later. In order to distinguish the function 124 from the data migration management function 128 of the storage, the initiator function 220 of the host is also referred to as a host initiator function or simply as a host initiator.

The iSNS client function 126 is a function for issuing a register/change request to the iSNS server.

The operation of the data migration management function 128 will be described with reference to FIG. 7.

Though not described in detail, an iSCSI name and an IP address is set for the initiator function 124. The management server 50 performs this setting. The IP address may be a value common to any one of the iSCSI targets of the storage system 10A.

Figure 3:
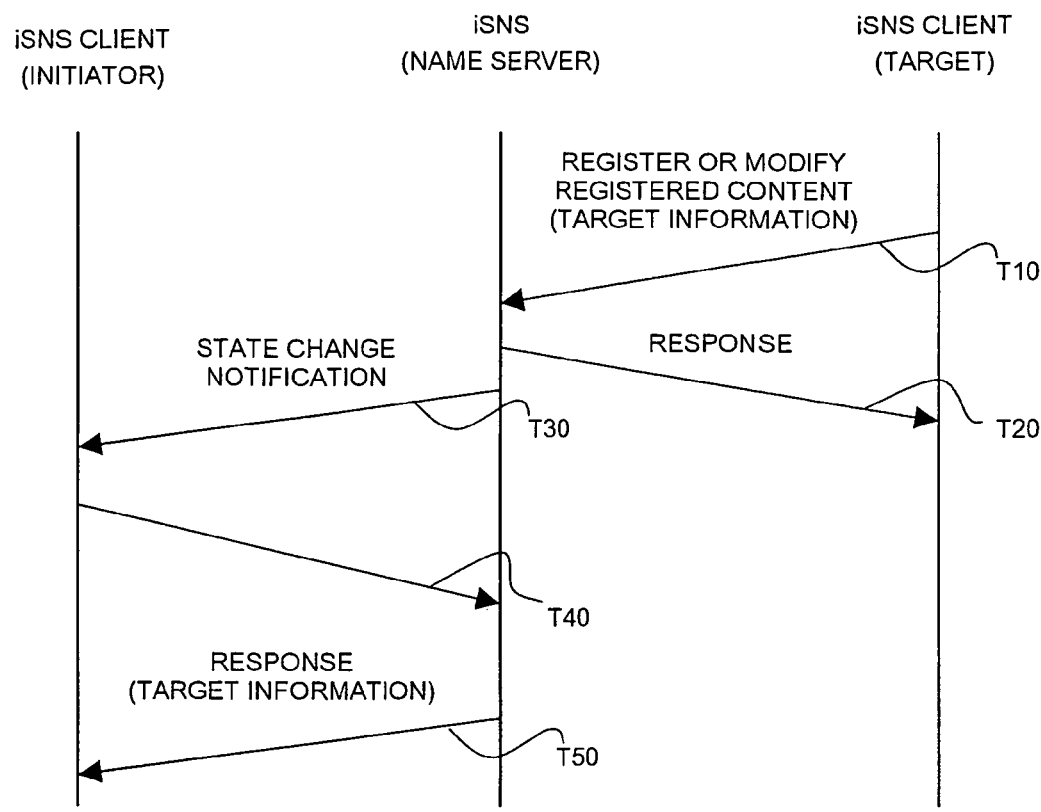
FIG. 3 is an explanatory view showing one operation example of a registration process of an iSNS name server.

FIG. 3 is an explanatory view showing an operation example of a registration/change process of the iSNS server. The communication of the iSNS is standardized by IETF.

In the case of IP-SAN, the iSNS server receives target information T10 from the iSNS client, and returns a response T20 in response thereto, while registering the relationship between the IP address and the iSCSI name to the database. When there is change in the target information being registered in the database, the iSNS sends an SCN (state change notification) T30 to the iSNS client within the area affected by the target (hereinafter referred to as "discovery domain", the details of which will be described later.) The iSNS client having received the SCN issues a query T40 inquiring the contents of the change to the iSNS, and acquires the updated target information as response T50. These are the basic operations of the iSNS server.

FIG. 4 is an explanatory view illustrating one example of the structure of an initiator information management table 1000 that the storage 10A manages for each target. The initiator information management table 1000 is a table for storing the initiator information necessary for the target function 122 to communicate with the initiator of the host, which is stored in the control memory 130. The management server 50 and the target function 122 add and update the host information.

The initiator information is composed of index used for internal processes, iSCSI name for identifying the host initiator, IP address and authentication information. The iSCSI name and authentication information are registered in advance from the management server 50 for the host initiator capable of accessing the relevant target. When the host initiator logs in to access the relevant target function and the login is accepted in a login reception process, the IP address of the host is stored. The details of the login reception process will be described with reference to FIG. 6.

In the example of FIG. 4, the initiator information management table stores initiator information 1010 and 1020.

In the initiator information 1010 corresponding to initiator 220 of the host 10A, the index is 10A, the iSCSI name is com.hitachi.server-001, and the IP address is 192.168.0.10. The initiator authentication information utilizes CHAP (challenge handshake authentication protocol) as authentication protocol, and the secret thereof (functioning as the password) is abcdef.

In the initiator information 1020 corresponding to initiator 220 of the host 10B, the index is 10B, the iSCSI name is com.hitachi.server-002, and the IP address is 192.168.0.20. The initiator authentication information does not require authentication (none).

FIG. 5 is an explanatory view showing one example of the structure of a target information management table 1100 that the storage 10A manages for each target. The target information management table 1100 is a table storing necessary information for the operation of the target function, and is stored in the control memory 130. The management server 50, the target function 122 and the data migration management function 128 add and update the target information.

The target information is composed of index used for internal processes, LU mapping (described in detail later), iSCSI name for identifying the target, IP address, host initiator in communication, data migration state, migration destination address and migration destination LU.

The LU mapping, the iSCSI name and the IP address are set in advance from the management server 50. In the initial state of target definition, the host initiator in communication is none, the data migration state is "not migrating", and the migration destination address and LU are not applicable (N/A).

In the example of FIG. 5, the target information management table stores target information 1110 and 1120.

In the target information 1110 corresponding to the target function 20A, the index is 20A, the iSCSI name is com.hitachi.raid-001, and the current IP address is 192.168.0.100. As for LU mapping, the LU of LUN=6 is assigned. This means that when the host initiator logs into the target function 20A, the access to the storage area defined by LUN=6 of storage system 10A is enabled.

The inner index of the initiator in communication is 10A.

Further, as for the data migration, the status is "data moving", the migration destination address is 192.168.0.110, and the LU of LUN=1 is assigned in the migration destination.

When the migration state is "data moving", the target function carries out the LU copying process to the migration destination, and at the same time, stores the block updated by the host initiator regarding the already-copied areas. The details of the data migration process will be described with reference to FIG. 7.

In the target information 1120 corresponding to the target function 20B, the index is 20B, the iSCSI name is com.hitachi.raid-002, and the IP address is 192.168.0.101. As for LU mapping, the LU of LUN=7 is assigned. This means that when the host initiator logs into the target function 20B, the access to the storage area defined by LUN=7 of storage system 10A is enabled.

Further, the data migration state is "not migrate", and the migration destination address and LU are not applicable (N/A).

[Operation of the Communication Process]

Figure 6:
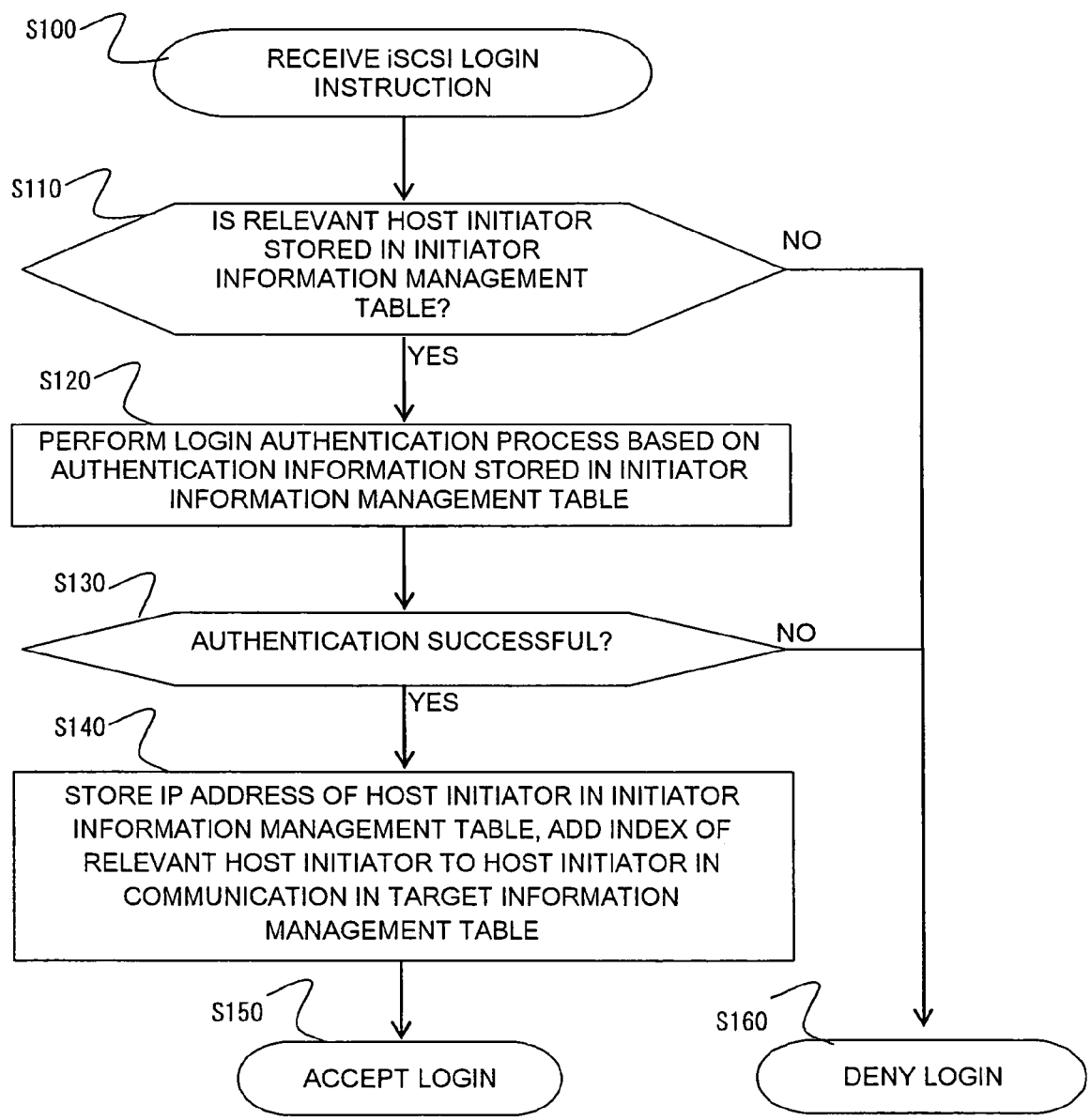
FIG. 6 is a flowchart showing a login reception process according to embodiment 1.
Figure 7:
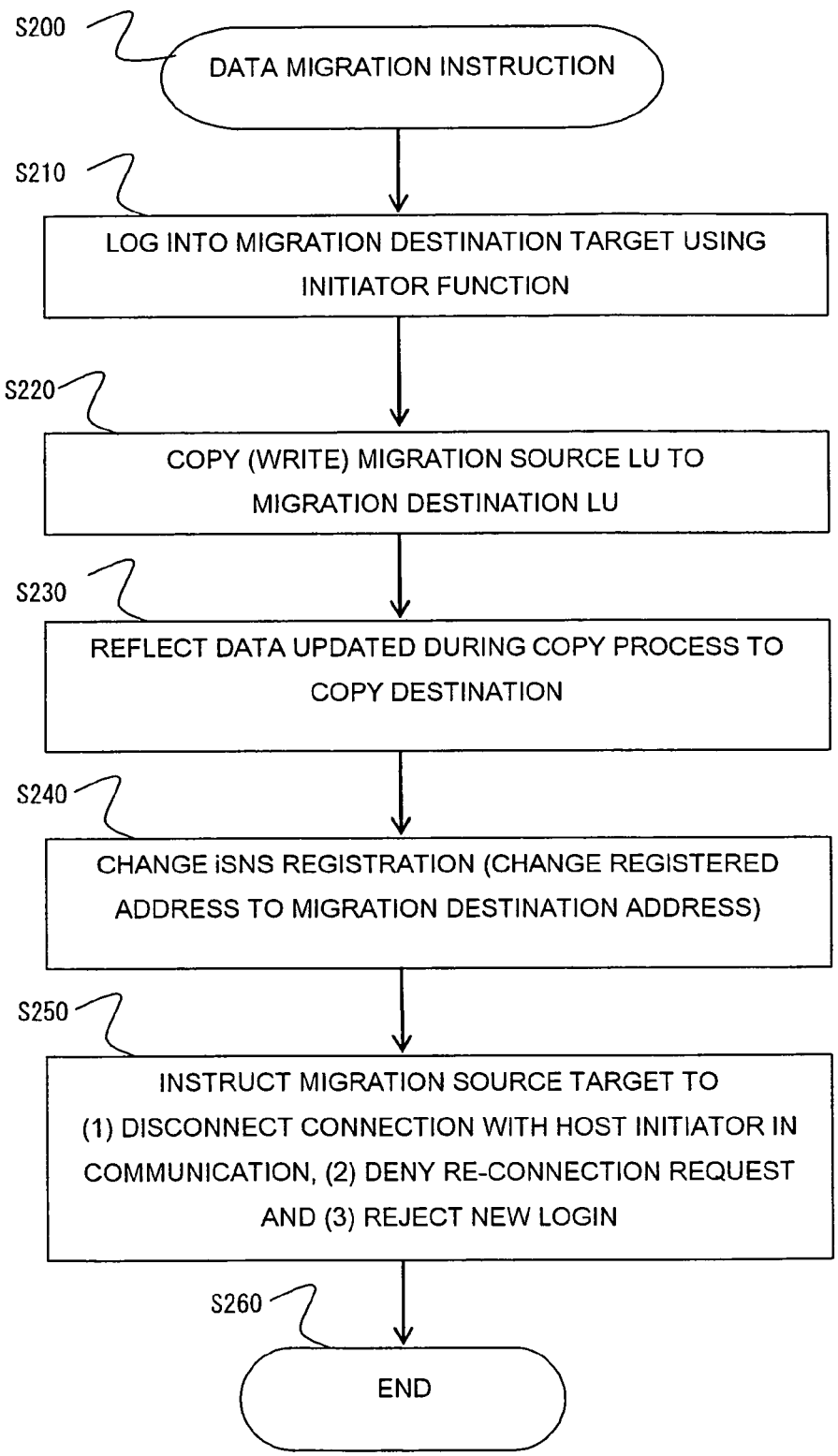
FIG. 7 is a flowchart showing a data migration process according to embodiment 1.

FIGS. 6 and 7 are examples of the flowchart showing the protocol control process according to the first embodiment. The target function 122 of the storage 100B being the migration destination target has a normal iSCSI target function, and does not require any specially added function.

FIG. 6 is a flowchart showing the login reception process of storage 10A according to the first embodiment. This process is carried out by the processor 120 executing the target function 122 stored in the control memory 130. The storage system 10 starts the login reception process when it receives an iSCSI login instruction (hereinafter referred to as "login instruction") from the network 30 (S100).

The login instruction includes an iSCSI name for identifying the host initiator which is the source issuing the login instruction and requesting login. Based on the iSCSI name stored in the login instruction being received, the target function 122 determines whether or not the relevant initiator is stored in the initiator information management table 1000 (S110).

If the host initiator requesting login is not stored in the initiator information management table in S110, a response to deny login is output to the host initiator (S160).

If the host initiator requesting login is stored in the initiator information management table in step S110, then a login authentication process is performed based on the authentication information stored in the initiator information management table (S120), and whether authentication has succeeded or not is determined (S130). If authentication fails, a response to deny login is output to the host (S160).

If authentication succeeds in step S130, the IP address of the relevant host initiator is stored in the initiator information management table, the index of the relevant host initiator is added as initiator in communication in the target information management table (S140), and a response to accept login is sent to the initiator (S150). The IP address of the initiator is acquired from the header information of the IP packet storing the login instruction. The login reception process is completed in S150, but thereafter, storing or reading of data is performed in response to the instruction from the initiator.

FIG. 7 is a flowchart showing the data migration process according to embodiment 1. This process is realized by the processor 120 executing the data migration function 128 stored in the control memory 130 in conjunction with the target function 122, the initiator function 124 and the iSNS client function.

The storage system 10A starts the data migration process when it receives a data migration instruction from the management server 50 (S200). The data migration process includes the iSCSI name indicating the migration source target, the IP address of the migration destination target, and the LU mapping information of the target at the migration destination.

At first, the data migration function 128 utilizes the initiator function 124 to log into the migration destination target (S210). At this time, the iSCSI name of the migration destination target is the same as the destination source target.

Next, the data migration function 128 utilizes the initiator function 124 to copy all the contents of the migration source LU to the migration destination LU. The copy is performed using the write instruction of SCSI, and by sequentially performing write process of each of the blocks in the LU. During the copy process it is possible that the migration source target (migration source LU) is subjected to data update from the host initiator 220, and regarding the update to the already-copied area, the block being updated is stored in the memory (S220).

After completing copy of all the areas in the LU being the object of migration, the data migration function 128 instructs the target function 122 of the migration source to reject new update instructions, and utilizes the initiator function 124 to write to the migration destination the contents of the blocks being updated by the initiator after copy stored in S230 to reflect the update to the migration destination (S230).

Then, the data migration function 128 utilizes the iSNS client function 126 to change the registration of the migration source target being registered in the iSNS server in advance. In other words, the registered IP address is changed to the IP address of the migration destination (S240). After completing change of registration, it is possible to confirm the contents of the change by referring to the registered contents of the relevant iSCSI name in the iSNS server and confirming that the IP address is changed.

Each host initiator 220 receives SCN from the iSNS, but as for the host initiator 220 communicating with the migration source target, it is assumed that the communication with the migration source target is ongoing without being switched to the communication with the migration destination target. This is coped with in the following step S250. As for the host initiators 220 that are not in communication, the migration of target is performed at this time. In other words, the host initiators 220 access the iSCSI target identified by the relevant iSCSI name by the migration destination IP address, so that new logins are performed to the migration destination target. Further, during processes S200 through S240, the migration source target function processes the access request from the host initiator 220 in a similar manner as the process performed by a normal iSCSI target. In other words, the migration source target performs steps S200 through S240 in parallel in the background of processing accesses from the host initiator 220.

Thereafter, the data migration function 128 instructs the migration source target function 122 to (1) disconnect the connection with the host initiator 220 in communication, (2) deny reconnection request, and (3) reject or neglect new login (S250). The disconnection of communication is actually performed by cutting TCP connection, by sending TCP FIN or TCP RST. The denial of reconnection request is performed by sending TCP FIN or TCP RST again when the initiator 220 transmits a TCP connection establishment request (TCP SYN) again. When there are plural host initiators 220 in communication, all the host initiators are subjected to the above process. Thus, the communication between the host initiator 220 and the migration source target is discontinued. The host initiator 220 realizes connection with the migration destination target based on the contents of the changed iSNS, and continues to perform access to the target prior to disconnection of communication. The connection is expected to be realized as a part of a failure recovery function of the host initiator 220, and the access is continued in approximately one second from the disconnection.

Thereafter, the data migration process is ended (S260). Although not shown, the initiator function 124 performs a logout process to the migration destination target.

According to the present embodiment, the communication with the host initiator communicating with the migration source target at the time of data migration is disconnected from the migration source target, so that the connection recovery at the TCP layer of the host initiator is performed as a login to the migration destination target.

In general, this type of connection recovery process is expected to be performed at high speed (one second or shorter). At the time of recovery, iSCSI login is performed to the IP address of the migration destination target, so it does not affect the host application and OS other than having to wait for access during recovery or target switching.

The host initiator in communication is distinguished by referring to the index of the initiator in communication in the target information of the migration source target in the target information management table 1100.

Figure 14:
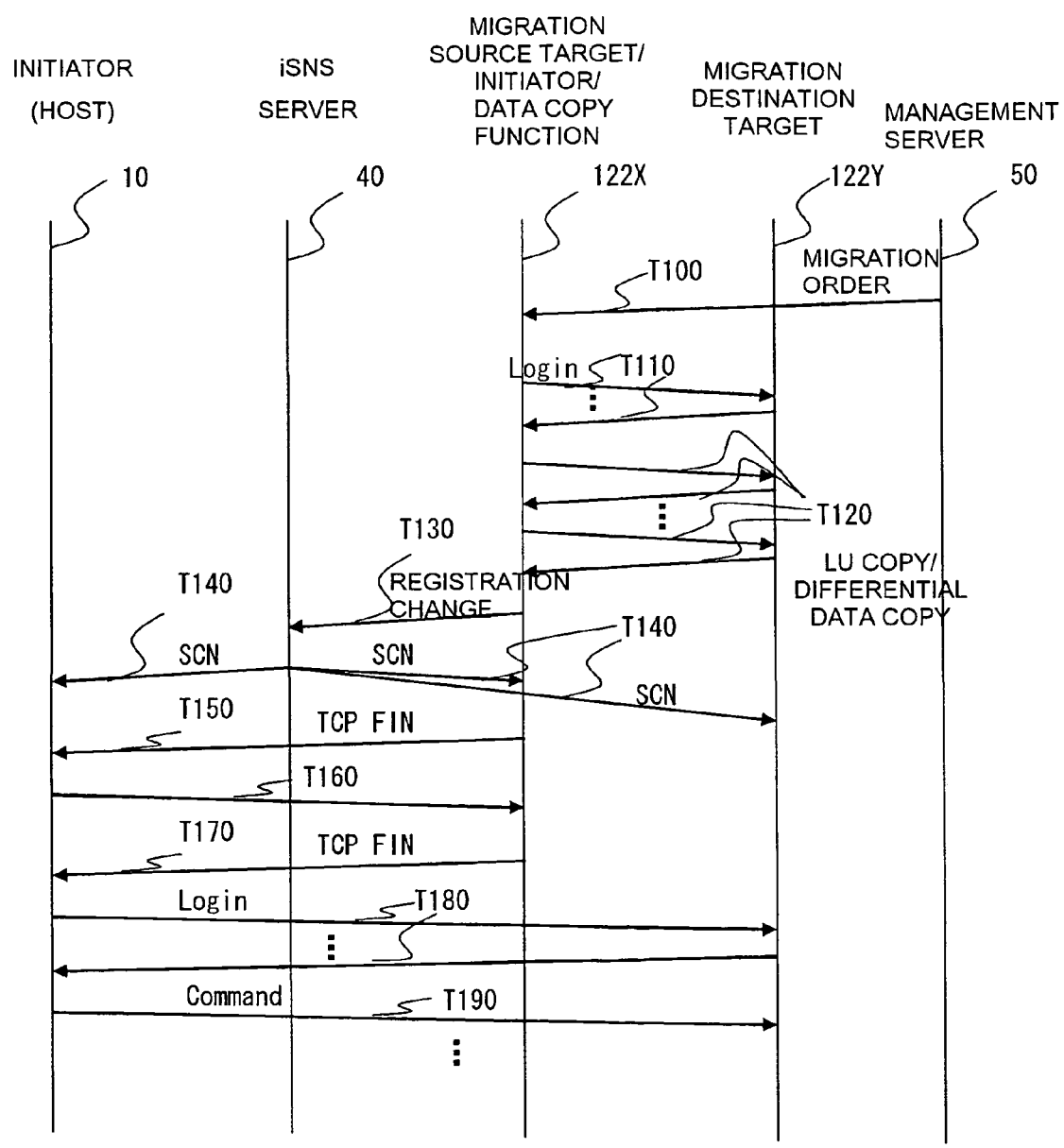
FIG. 14 is an explanatory view showing communication between devices during data migration of embodiment 1.
Figure 15:
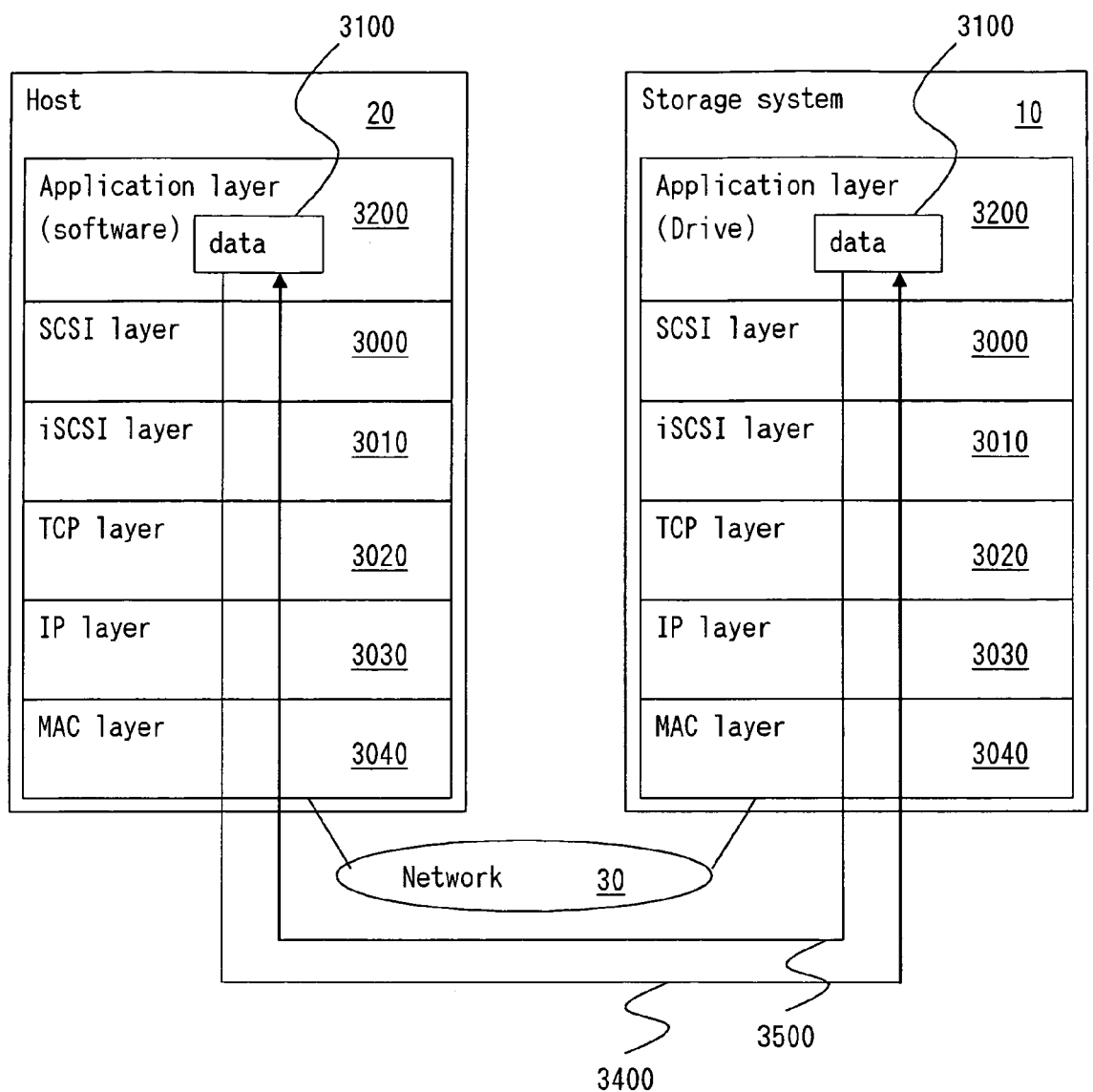
FIG. 15 is an explanatory view showing the relationship between a protocol hierarchy of devices performing iSCSI communication and the transmission and reception of data.

FIG. 14 is an explanatory view showing the communication between devices in data migration according to embodiment 1. The vertical direction of the drawing shows the passing of time, and the arrows show communication. The migration source target, the initiator function and the data migration function 124 are denoted as 122X in the drawing, and the migration destination target is denoted as 122Y.

At first, the management server 50 transmits a data migration order T100 to the migration source target 122X. The migration source target transfers the same to the initiator function, and the data migration process described in FIG. 7 is started. In other words, the initiator performs login to the migration destination target 122Y (T110, S210 of FIG. 7), the migration source LU is copied to the migration destination, and the data updated during the copying process (differential data) is reflected on the migration destination LU (T120, S220 through S230 of FIG. 7).

Thereafter, registration change of IP address of the relevant target is performed in the iSNS server (T130 through T140, S240 of FIG. 7), and the connection between the initiator 220 of the host in communication is disconnected (T150). Although not shown in the drawing, the host initiator 220 performs normal access to the migration source target until T150 is issued. After disconnecting communication with the initiator 220 by T150, the migration source target denies reconnection even if a reconnection request (T160) is issued from the host initiator 220 (T170, S250 of FIG. 7).

Thus, the host initiator 220 logs into the IP address notified by T140 of SCN from the iSNS server (T180) and continues the process subsequent to the communication disconnected by T150.

As described, the first embodiment of the present invention enables targets to be switched between different storages in a short time and without the application being aware of the switch. The host is only expected to perform the function to recover connection of the TCP layer, which is apart of a function realized by a normal initiator, so there is no need for a special path switching function or a storage switching function. Moreover, the migration destination target is only required to have a normal iSCSI target function.

Second Embodiment

In the second embodiment, the target is switched from storage 10B to storage 1A, which is different from the first embodiment. The second embodiment also characterizes in that the target is switched at first and then the data migration is executed in the background while processing accesses from the host in the migration destination target.

[System Configuration]

The H/W configuration of the computer system 1 (1B) according to the second embodiment is the same as that of the first embodiment.

Figure 8:
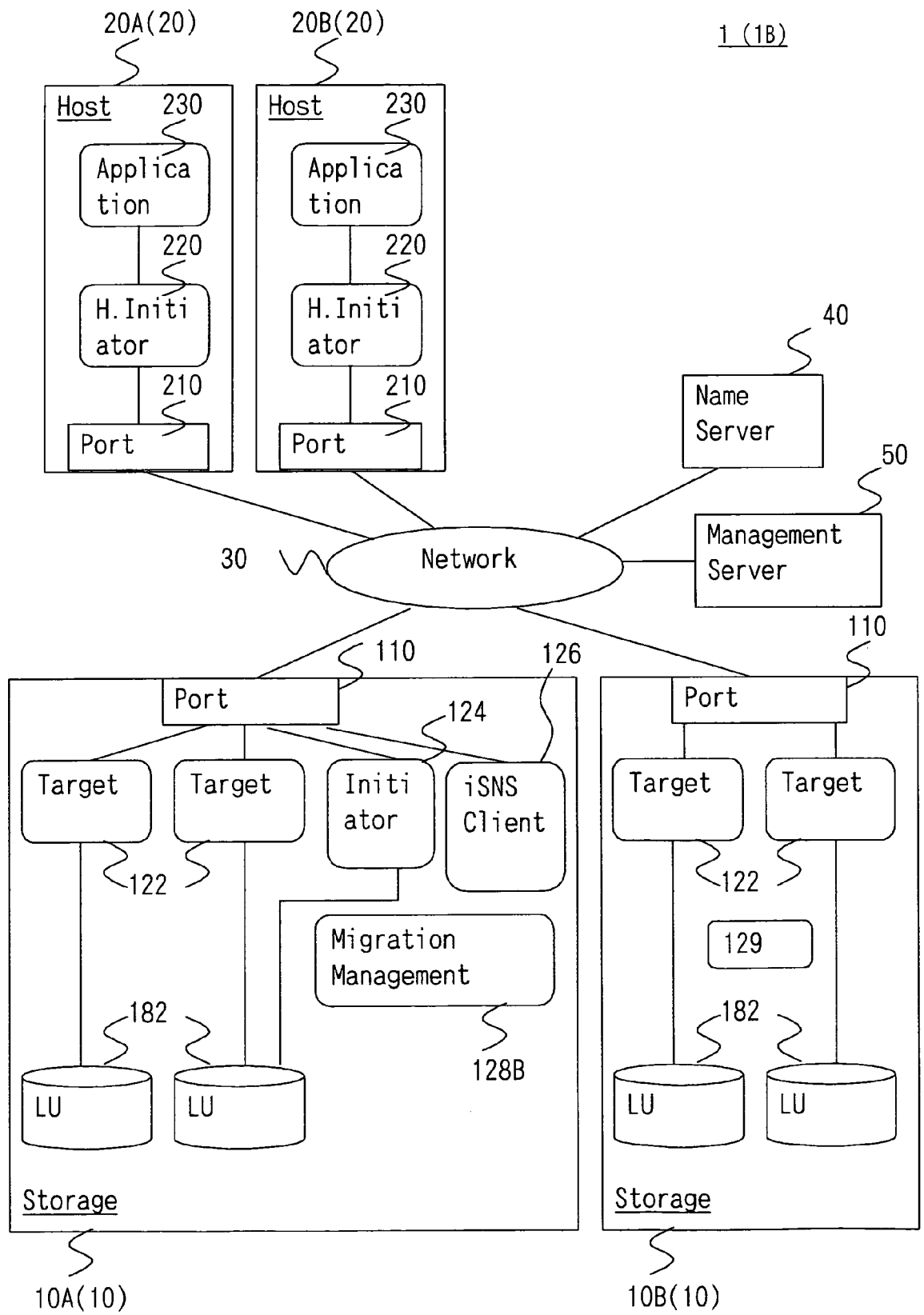
FIG. 8 is an explanatory view showing a module configuration of a computer system 1B according to embodiment 2.

FIG. 8 is an explanatory view showing the module configuration of the computer system 1B according to embodiment 2. The storage 10B has a connection disconnection function 129 for controlling the target function 122. Further, the data migration function of storage 10A is denoted as 128B. Other components are the same as those of FIG. 3 of embodiment 1.

[Operation of the Communication Process]

Figure 9:
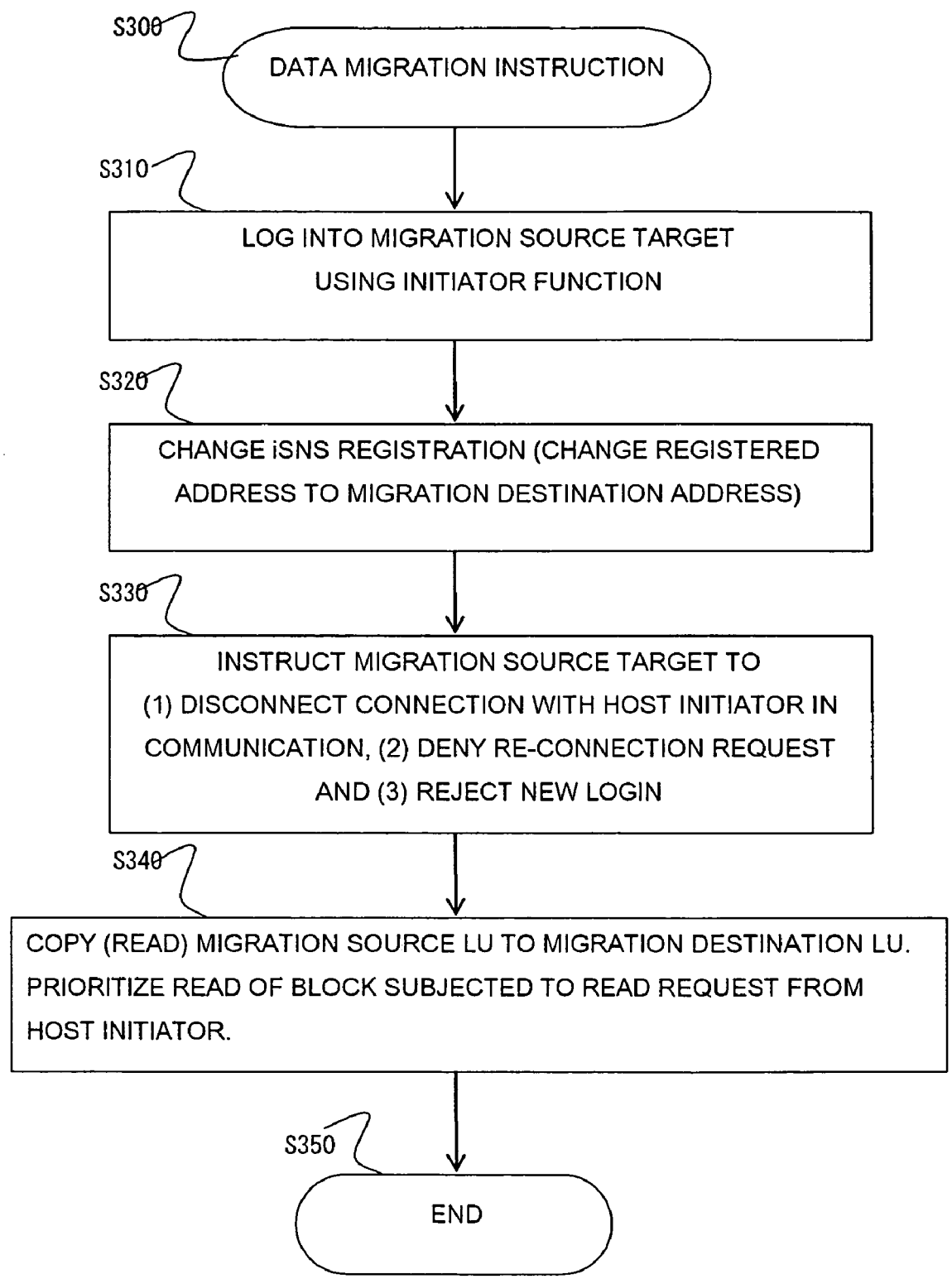
FIG. 9 is a flowchart showing a data migration process according to embodiment 2.

FIG. 9 is an example of the flowchart showing the data migration process according to the second embodiment. The login reception process of storage 10A is the same as that of the first embodiment (FIG. 6).

The data migration process is carried out by the processor 120 executing the data migration function 128B stored in the control memory 130 in conjunction with the target function 122, the initiator function 124 and the iSNS client function 126.

The storage system 10A starts the data migration process upon receiving a data migration instruction from the management server 50 (S300). The data migration process includes the iSCSI name denoting the target of the migration source, the IP address of the target of the migration source and the LU mapping information in the target of the migration source.

At first, the data migration function 128B uses the initiator function 124 to log into the migration source target (S310). At this time, the iSCSI name of the migration source target is the same as the migration destination target.

Next, the data migration function 128B utilizes the iSNS client function 126 to change the registration of the migration source target being registered in the iSNS server in advance. In other words, the registered IP address is changed to the IP address of the migration destination (S320). After completing change of registration, it is possible to confirm the contents of the change by referring to the registered contents of the relevant iSCSI name in the iSNS server and confirming that the IP address is changed.

Each host initiator 220 receives SCN from the iSNS, but as for the host initiator 220 communicating with the migration source target, it is assumed that the communication with the migration source target is ongoing without being switched to the communication with the migration destination target. This is coped with in the following step S330. As for the initiators 220 that are not in communication, the migration of target is performed at this time. In other words, the initiators 220 access the iSCSI target identified by the relevant iSCSI name by the migration destination IP address, so that new logins are performed to the migration destination target.

Thereafter, the data migration function 128B instructs the connection disconnection function 129 of the migration source target to (1) disconnect the connection with the host initiator in communication, (2) deny reconnection request, and (3) reject or neglect new login (S330). The disconnection is actually performed by cutting TCP connection, by sending TCP FIN or TCP RST. The denial of reconnection request is performed by sending TCP FIN or TCP RST again when the initiator 220 transmits a TCP connection establishment request (TCP SYN) again. When there are plural host initiators 220 in communication, all the host initiators are subjected to the above process. Thus, the communication between the host initiator 220 and the migration source target is discontinued. The host initiator 220 realizes connection with the migration destination target based on the contents of the changed iSNS, and continues to perform access to the target prior to disconnection of communication. The connection is expected to be realized as a part of a failure recovery function of the host initiator 220, and the access is continued in approximately one second from the disconnection.

Thereafter, the data migration function 128B utilizes the initiator function 124 to copy all contents of the migration source LU to the migration destination LU. The copy process is performed using read instructions of SCSI, and by sequentially reading the blocks in the LU. The process is performed in parallel with the access from the host. It is possible that the LU is subjected to data update from the host during the copying process, and a not-yet-copied area is subjected to update, the reading of the updated block from the migration source LU is not performed. If there is a read request from the host initiator 220 to the not-yet-copied area, the copying of the relevant area from the migration source LU is prioritized (S340).

When all the areas of the LU being the object of migration is completed, the data migration function 128B ends the data migration process (S350). Although not shown, the initiator function 124 performs a logout process to the migration source target.

As described, the second embodiment of the present invention also enables targets to be switched among different storages in a short time and without the application being aware of the switch. The host is only expected to perform the function to recover connection of the TCP layer, which is apart of a function realized by a normal initiator, so there is no need for a special path switching function or a storage switching function. Moreover, the migration source target is required to have a connection disconnection function 129 in addition to a normal iSCSI target function.

Third Embodiment

In the third embodiment, the target is switched from a port of storage 10A to a port on a different storage controller of the same storage 10A, which is different from the first and second embodiments. The third embodiment characterizes in that the time required for copying the LU is shorter compared to the first and second embodiments since the switching is performed in the same storage. It is applicable for dispersing loads among controllers and the like.

[System Configuration]

The H/W configuration of the computer system 1 (1C) according to the third embodiment is the same as that of the first embodiment but without the storage 10B.

Figure 10:
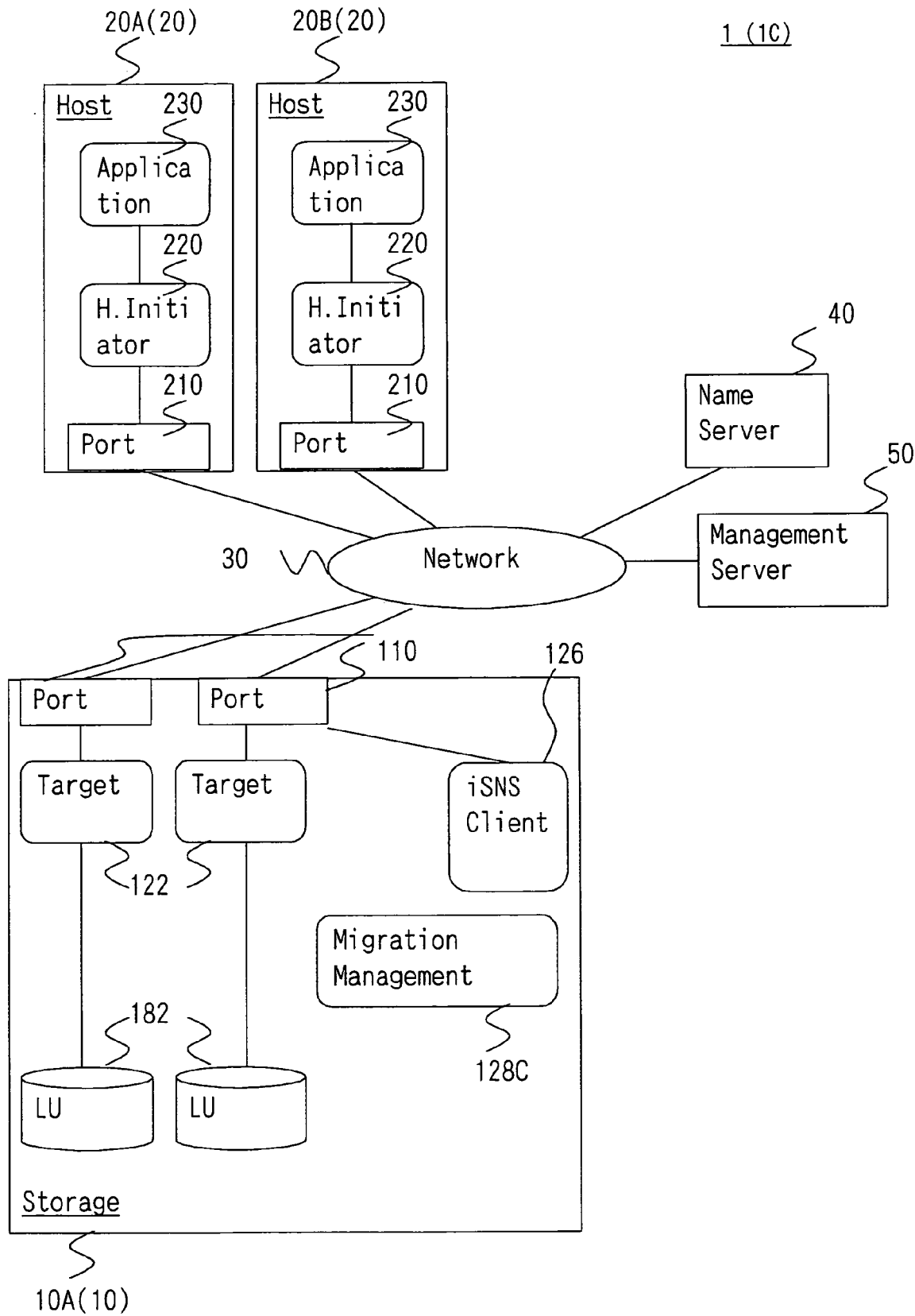
FIG. 10 is an explanatory view showing a module configuration of a computer system 1C according to embodiment 3.

FIG. 10 is an explanatory view showing the module configuration of the computer system 1C according to the third embodiment. The data migration function of storage 10A is denoted as 128C. There is no need for the storage 10A to have the initiator function, since unlike embodiments 1 and 2, there is no need according to the present invention to copy LUs among storages. Other components are the same as those of FIG. 3 of embodiment 1.

[Operation of the Communication Process]

Figure 11:
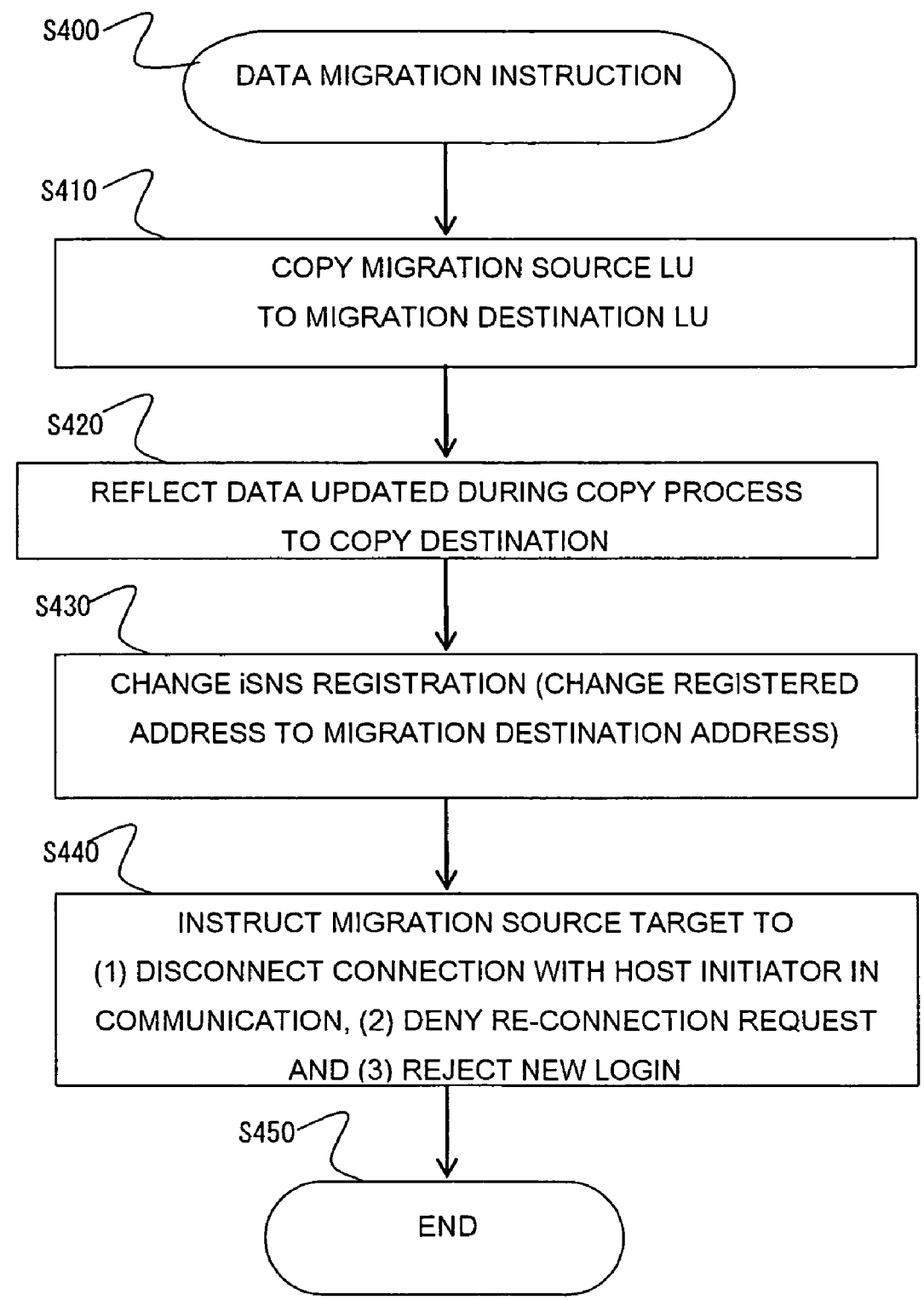
FIG. 11 is a flowchart showing a data migration process according to embodiment 3.

FIG. 11 is an example of the flowchart showing the data migration process according to the third embodiment. The login reception process of storage 10A is the same as that of the first embodiment (FIG. 6). The data migration process is carried out by the processor 120 executing the data migration function 128C stored in the control memory 130 in conjunction with the target function 122 and the iSNS client function 126.

The storage system 10A starts the data migration process upon receiving a data migration instruction from the management server 50 (S400). The data migration process includes the iSCSI name denoting the target of the migration source, the IP address of the target of the migration destination and the LU mapping information in the target of the migration destination.

At first, the data migration function 128C copies all the contents of the migration source LU to the migration destination LU. The copy process is realized by the data replication function of the device (S410). It is possible that the migration source target (migration source LU) is subjected to data update from the host initiator 220 during the copy process, and if the update regards an already-copied area, the updated block is stored in the memory (S420).

After completing copy of all the areas in the LU being the object of migration, the data migration function 128 instructs the target function 122 of the migration source to reject new update instructions, and utilizes the initiator function 124 to write to the migration destination the contents of the blocks being updated by the initiator after copy stored in S420, to reflect the update to the migration destination.

Next, the data migration function 128C utilizes the iSNS client function 126 to change the registration of the migration source target being registered in the iSNS server in advance. In other words, the registered IP address is changed to the IP address of the migration destination (S430). After completing change of registration, it is possible to confirm the contents of the change by referring to the registered contents of the relevant iSCSI name in the iSNS server and confirming that the IP address is changed.

Each host initiator 220 receives SCN from the iSNS, but as for the host initiator 220 communicating with the migration source target, it is assumed that the communication with the migration source target is ongoing without being switched to the communication with the migration destination target. This is coped with in the following step S440. As for the host initiators 220 that are not in communication, the migration of target is performed at this time. In other words, the host initiators 220 access the iSCSI target identified by the relevant iSCSI name by the migration destination IP address, so that new logins are performed to the migration destination target. Further, during processes S400 through S430, the migration source target function processes the access request from the host initiator 220 in a manner similar to the process of a normal iSCSI target. In other words, the migration source target performs the processes of S400 through S430 in parallel in the background of processing the accesses from the host initiator 220.

Thereafter, the data migration function 128C instructs the migration source target function 122 to (1) disconnect the connection with the host initiator 220 in communication, (2) deny reconnection request, and (3) reject or neglect new login (S440). The disconnection is actually performed by cutting the TCP connection by sending TCP FIN or TCP RST. The denial of reconnection request is performed by sending TCP FIN or TCP RST again when the initiator 220 transmits a TCP connection establishment request (TCP SYN) again. When there are plural host initiators 220 in communication, all the host initiators are subjected to the above process. Thus, the communication between the host initiator 220 and the migration source target is discontinued. The host initiator 220 realizes connection with the migration destination target based on the contents of the changed iSNS, and continues to perform access to the target prior to disconnection of communication. The connection is expected to be realized as a part of a failure recovery function of the host initiator 220, and the access is continued in approximately one second from the disconnection. Thereafter, the data migration process is ended (S450).

As described, the third embodiment of the present invention also enables targets to be switched within the same storage in a short time and without the application being aware of the switch. This process may seem to the host like a switch of path for accessing the target. The host is only expected to perform the function to recover connection of the TCP layer, which is a part of a function realized by a normal initiator, so there is no need for a special path switching function or a storage switching function. Moreover, the migration destination target is only required to have a normal iSCSI target function.

Fourth Embodiment

In the fourth embodiment, unlike embodiments 1 through 3, the iSNS server is not used as the means for notifying change of IP address related to the target to the initiator. Instead, the initiator is required to have a path management function 240, to which the migration source address and migration destination address of the target are registered in advance. For example, the migration source address is registered as the path for normal access, and the migration destination address is registered as an alternate path.

Communication is established from the host initiator to the migration source target, but whether or not it is necessary to also establish a communication with the migration destination target in advance depends on the path management function 240 of the initiator. For example, it is not necessary to establish an alternate path in advance if the path management function 240 is set to establish an alternate path registered in advance when a failure occurs in a path during communication and to continue the access disconnected by the failure.

[System Configuration]

The H/W configuration of the computer system 1 (1D) according to the fourth embodiment is the same as that of the third embodiment, which is the same as the first embodiment but without the storage 10B.

Figure 12:
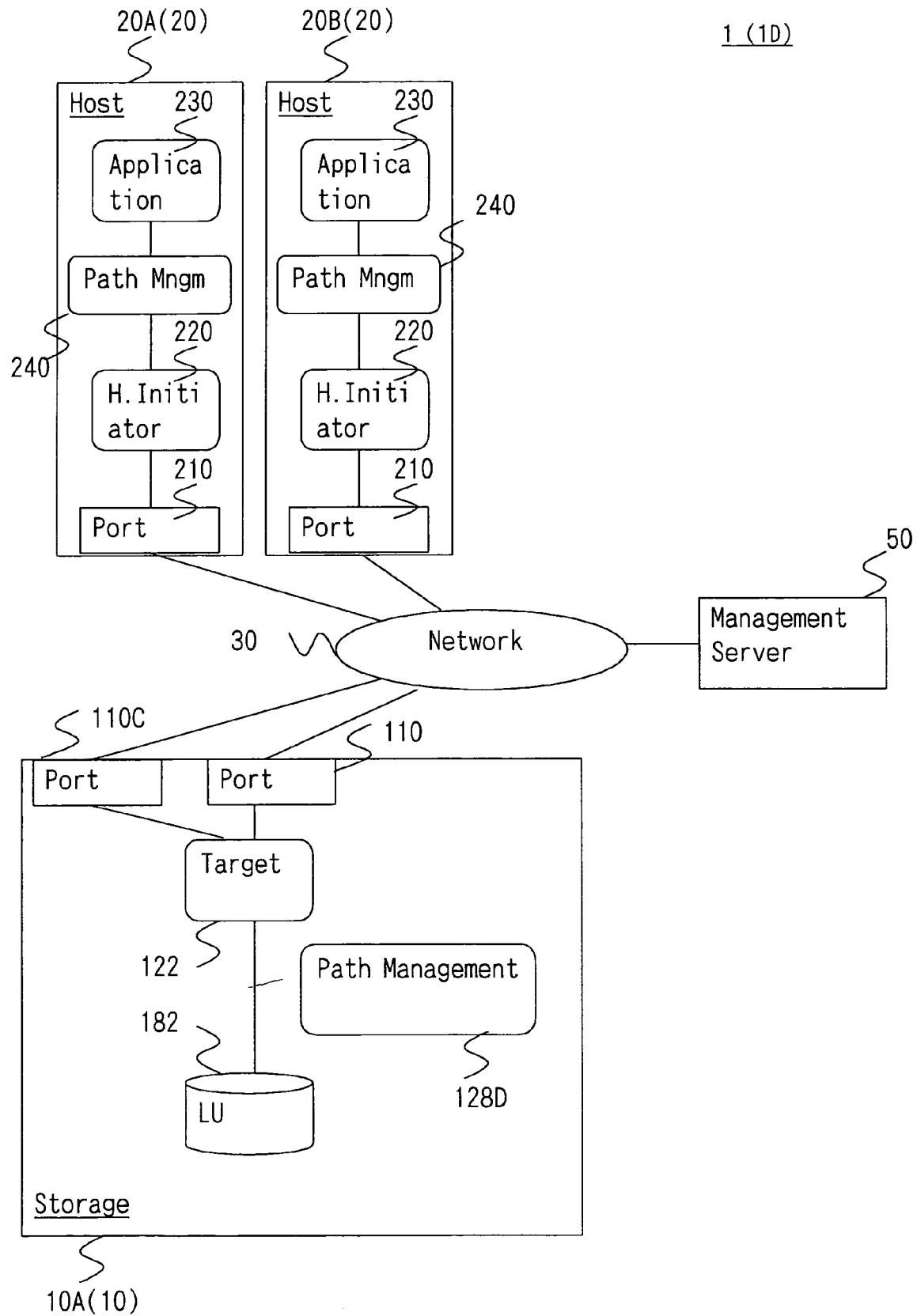
FIG. 12 is an explanatory view showing a module configuration of a computer system 1D according to embodiment 4.

FIG. 12 is an explanatory view showing the module configuration of the computer system 1 (1D) according to the fourth embodiment. According to the present embodiment, the migration source and migration destination of target 122 and LU 182 are the same. The address in which the host accesses the target 122 is switched from an IP address of port 110 to an IP address of a different port 110C. Therefore, the storage 10A has a path switching function 128D instead of a data migration function 128. In the host 20, the aforementioned path management function 240 is disposed between the host initiator function 220 and the application 230. Other components are the same as those of embodiment 3.

[Operation of the Communication Process]

Figure 13:
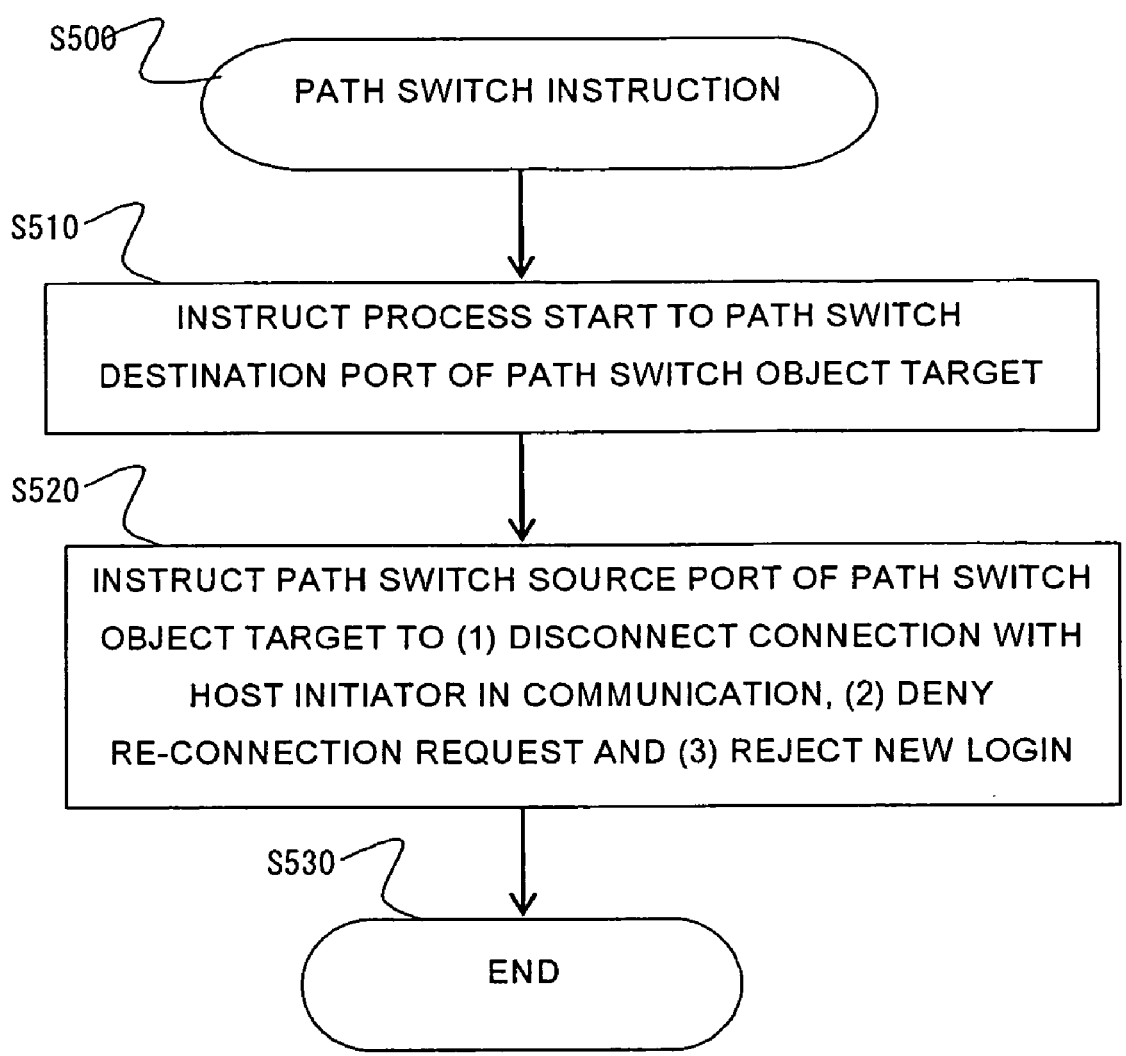
FIG. 13 is a flowchart showing a path switch process according to embodiment 4.

FIG. 13 is an example of the flowchart showing the path switching process according to the fourth embodiment. The login reception process of storage 10A is the same as that of the first embodiment (FIG. 6). The data migration process is carried out by the processor 120 executing the path switching function 128D stored in the control memory 130 in conjunction with the target function 122.

The storage system 10A starts the path switching process upon receiving a path switching instruction from the management server 50 (S500). The path switch process includes the iSCSI name denoting the target of the migration source, the port identification information of the port of the migration source and the port of the migration destination of the path. The port identification information can be the port number managed by sequential numbers by the storage device 20A, for example.

Next, the path switching function 128D instructs the path switch destination port of the path switch object target designated in S500 to start the process (S510).

Thereafter, the path switching function 128D instructs the path switch source port of the path switch object target designated in S500 to (1) disconnect the connection with the host initiator in communication, (2) deny reconnection request, and (3) reject new login (S520). The disconnection is actually performed by cutting the TCP connection by sending TCP FIN or TCP RST. The denial of reconnection request is performed by sending TCP FIN or TCP RST again when the initiator 220 transmits a TCP connection establishment request (TCP SYN) again. When there are plural host initiators 220 in communication, all the host initiators are subjected to the above process. Thus, the communication between the host initiator 220 and the target using the source path before switching is discontinued. The host initiator 220 realizes connection using the alternate path based on the information registered in advance in the path management function 240, and continues access to the target prior to disconnection of communication. The connection is expected to be realized at high speed as a part of the path management function 240. Thereafter, the data migration process is ended (S450).

As described, the fourth embodiment of the present invention enables the path accessing the target to be switched in a short time without the application being aware of the switch though it requires a path management function 240 in the host and multiple paths to be registered in advance.

There are other varieties of modified examples of the present embodiments. For example, in the first embodiment, the migration source target outputs a TCP FIN signal or a TCP RST signal in order to disconnect the communication between the initiator and the migration source target, but this can be replaced with a transmission of an iSCSI logout request PDU, which is an asynchronous message requesting a logout instruction of the initiator in the iSCSI layer.

Moreover, the fourth embodiment can realize switching of targets between different devices (by adding an iSCSI initiator function and an appropriate data migration process similar to those of first and second embodiments) as target switching means in a computer system that does not have an iSNS.

According to the third and fourth embodiments, the switching is performed between ports belonging to different controllers within the same storage device, but the switching can be performed between ports belonging to the same controller. In other words, the target function of the migration source and migration destination can be executed on the same processor 120.

Further according to the third and fourth embodiments, similar to the first embodiment, the switching of target and path are performed after completely copying the LU in the background. However, the order of the processes can be reversed as in the second embodiment, and the switching of target and path can be executed before copying the LU in the background.

Moreover, according to the third and fourth embodiments, the migration source port and the migration destination port can be physically the same. In other words, the port 110 can have multiple IP addresses, and the switching of target and switching of path can be executed so that the initiator accesses the target via a different IP address.

Moreover, the first through third embodiments can each have multiple iSNS servers.

In the embodiments, the management server is connected to the IP network 30 and the communication with the storage is performed via port 110, but the storage can have an interface for communicating with the management server that is different from the one for communicating with the host. In other words, the storage can have an interface other than port 110 to which the management server is connected instead of via the IP network 30.

Each embodiment can be applied not only to the SAN connection form illustrated in the drawings but also to various other connections. For example, the IP network 30 can be constructed not on the gigabit Ethernet (registered trademark) but on other networks.

Moreover, each embodiment can have multiple initiators that connect to a single target.

Moreover, in each embodiment, a single target can have multiple LUs associated thereto via LU mapping.

Furthermore, in each embodiment, the target migration can be started not by the instruction from the management server but by the data migration function 128 or the path switching function 128P in the storage device based on a policy determined in advance.

Essentially, the present invention is effectively applied to a storage system requiring hierarchical protocol processing, management of access objects based on a name server, and consideration on communication continuity of the application in the host.

The preferred embodiments of the present invention have been described above, but the present invention is not limited to the embodiments, and can be applied in various ways within the scope of the invention. Further, all the embodiments of the present invention are realized by reading and executing a program in a computer by a computing means.

A modified embodiment 1 of the present invention relates to a computer system, wherein the storage device has a means for associating and registering an identifier of the target and an address of the port to the name server.

A modified embodiment 2 of the present invention relates to a computer system, wherein the storage device has a means for migrating data from the migration source target to the migration destination target, and the storage device executes the registration change after execution of process by the data migration means.

A modified embodiment 3 of the present invention relates to a computer system, wherein the storage device has a means for migrating data from the migration source target to the migration destination target, and the storage device executes the registration change prior to execution of process by the data migration means.

A modified embodiment 4 of the present invention relates to a computer system, wherein the switching of communication means is caused by detecting that a processing quantity of the migration source port has exceeded a predetermined value.

A modified embodiment 5 of the present invention relates to a computer system, wherein the identifier is an iSCSI name, and the target belonging to the migration destination port is an iSCSI target, and the target belonging to the migration source port is an iSCSI target.

A modified embodiment 6 of the present invention relates to a computer system, wherein the communication means of the storage device is a TCP connection, and the communication disconnection process is performed by transmitting TCP FIN.

A modified embodiment 7 of the present invention relates to a computer system, wherein the communication means of the storage device is a TCP connection, and the communication disconnection process is performed by transmitting TCP RST.

A modified embodiment 8 of the present invention relates to a computer system, wherein the communication means of the storage device is an iSCSI connection, and the communication disconnection process is performed by transmitting iSCSI logout request.

A modified embodiment 9 of the present invention relates to a computer system, wherein the storage device denies any communication restart request from the host computer after performing the communication disconnection process.

A modified embodiment 10 of the present invention relates to a computer system further comprising a management server for instructing the storage device to execute the registration change process and the disconnection process for disconnecting all communication means established in the migration source target.

A modified embodiment 11 of the present invention relates to a storage device connected via a network to one or more host computers having a function to search for an alternate path when a defect is discovered in a path used between the storage, the storage device constituting a computer system with the host computer and a name server; wherein the storage device comprises a target communicating via a predetermined communication means with the host computer through a port, a registration change means for changing a registered address associated with the registration of a migration source target registered in the name server to an address of a migration destination port, and a means for disconnecting all communication means established in the migration source target subsequent to the registration change process.

A modified embodiment 12 of the present invention relates to a storage device further comprising a means for associating and registering an identifier of the target and an address of the port to the name server.

A modified embodiment 13 of the present invention relates to a storage device further comprising a means for migrating data from the migration source target to the migration destination target, and the storage device executes the registration change after execution of process by the data migration means.

A modified embodiment 14 of the present invention relates to a storage device, wherein the storage device receives an instruction from the management server connected thereto to execute the registration change process and the process of disconnecting all communication means established in the migration source target.

A modified embodiment 15 of the present invention relates to a management server constituting a computer system with one or more host computers having a function to search for an alternate path when a defect is discovered in a path used between a storage, one or more storage devices connected to the host computer via a network and having a target communicating via a predetermined communication means with the host computer through a port, and a name server, wherein the management server instructs the storage device to change a registered address associated with the registration of a migration source target registered in the name server to an address of a migration destination port, and to disconnect all communication means established in the migration source target.

Another modified embodiment 15 relates to a communication control method in a computer system comprising one or more host computers having a function to search for an alternate path when a defect is discovered in a path used between a storage, one or more storage devices connected to the host computer via a network and having a target communicating via a predetermined communication means with the host computer through a port, and a name server, the method comprising changing a registration of an address associated with the registration of a migration source target registered in the name server to an address of a migration destination port, and a means for disconnecting all communication means established in the migration source target subsequent to the registration change process.

A modified embodiment 16 of the present invention relates to a communication control method further comprising associating and registering an identifier of the target and an address of the port to the name server.

A modified embodiment 17 of the present invention relates to a communication control method, wherein the storage device comprises a means for migrating data from the migration source target to the migration destination target, and the storage device executes the registration change after execution of process by the data migration means.

A modified embodiment 18 of the present invention relates to a computer system in which the cause for switching the communication means is a detection of malfunction of the migration source controller.

A modified embodiment 19 of the present invention relates to a computer system including a step of executing a process to migrate data to a different computer, and the cause for switching the communication means is the termination of data migration process to the migration destination port.

A modified embodiment 20 of the present invention relates to a computer system including a step of executing a process to migrate data to a different computer subsequent to the process of disconnecting communication.

A modified embodiment 21 of the present invention relates to a communication control method including a step of executing a process to migrate data to a different computer, and the cause for switching the communication means is the termination of data migration process to the migration destination port.

A modified embodiment 22 of the present invention relates to a storage medium storing a communication control method executed by a storage having an iSCSI communication means, the communication control method being executed by a computer having a migration source port to which belongs an iSCSI target having a same iSCSI name as the iSCSI target belonging to a migration destination port, wherein the memory medium stores a communication control method including a step of executing a process to disconnect communication of a communication means being established between the target to which the identifier is associated and a host.

What is claimed is:

1. A computer system adapted to be coupled to one or more host computers and a name server, the one or more host computers having a function to search for an alternate path when a defect is discovered in a path used for reading/writing data from/to at least one of a plurality of storage devices, the computer system comprising:

a first storage device of the plurality of storage devices having a first port including a first target communicating with the one or more host computers through the first port, a first target address identifying the first target being registered to the name server, a second storage device of the plurality of storage devices having a second port including a second target for communicating with the one or more host computers through the second port, wherein the first storage device has a function for migrating data from a migration source target to a migration destination target and ordering the migration destination target to reject new update instructions and reflect data updated during migration, wherein the first storage device has a registration change function for changing the first target address, of the first target as the migration source target, registered in the name server to a second target address identifying the second target, as the migration destination target, of the second storage device, if data stored in the first storage device is migrated to the second storage device, wherein the first storage device has a function for disconnecting communications including a connection between the migration source target and the host computer, denying a re-connection request of the migration source target and rejecting a new login to the migration source target, for reading/writing data from/to the first storage device, established by the one or more host computers with the first target as the migration source target subsequent to the registration change process, and wherein the registration change function causes to change by detecting that a processing quantity of the first target as the migration source target has exceeded a value.

2. The computer system according to claim 1, wherein the first storage device has a function for associating and registering the first target address of the first target and an address of the first port to the name server.

3. The computer system according to claim 1, wherein the first storage device has a function for migrating data from the first target as the migration source target to the second target as the migration destination target, and the first storage device executes the registration change after execution of process by the data migration function.

4. The computer system according to claim 1, wherein the first storage device has a function for migrating data from the first target as the migration source target to the second target as the migration destination target, and the first storage device executes the registration change prior to execution of process by the data migration function.

5. The computer system according to claim 1, wherein the first target address is a first iSCSI name, the first target is a first iSCSI target, and the second target is a second iSCSI target.

6. The computer system according to claim 1, wherein the first target communicates with the one or more host computers by a TCP connection, and the communication disconnection process is performed by transmitting TCP FIN.

7. The computer system according to claim 1, wherein the first target communicates with the one or more host computers by a TCP connection, and the communication disconnection process is performed by transmitting TCP RST.

8. The computer system according to claim 1, wherein the first target communicates with the one or more host computers by an iSCSI connection, and the communication disconnection process is performed by transmitting iSCSI logout request.

9. The computer system according to claim 1, wherein the first storage device denies any communication restart request from the one or more host computers after performing the communication disconnection process.

10. The computer system according to claim 1, comprising a management server for instructing the first storage device to execute the registration change process and the disconnection process for disconnecting all communications established by the one or more host computers with the first target as the migration source target.

11. A storage system adapted to be coupled to one or more host computers, a name server and another storage system, the one or more host computers searching for an alternate path when a defect is discovered in a path used for reading/writing data from/to the storage systems, the storage system comprising:

a first port including a first target communicating with the one or more host computers through the first port, a first target address identifying the first target being registered to the name server, wherein the storage system migrates data from a migration source target to a migration destination target and orders the migration destination target to reject new update instructions and reflect data updated during migration, wherein the storage system changes the first target address, of the first target as the migration source target, registered in the name server to a second target address identifying a second target, as the migration destination target, of a second port of the another storage system, if data stored in the storage system is migrated to the another storage system, wherein the storage system disconnects communication including a connection between the migration source target and the host computer, denying a re-connection request of the migration source target and rejecting a new login to the migration source target, for reading/writing data from/to the storage system, established by the one or more host computers with the first target as the migration source target after changing the first target address to the second target address, and wherein the change from the first target as the migration source target to the second target as the migration destination target occurs when a processing quantity of the first target as the migration source target has exceeded a value.

12. The storage system according to claim 11, wherein the storage system associates and registers the first target address of the first target and an address of the first port to the name server.

13. The storage system according to claim 11, wherein the storage system migrates data from the first target as the migration source target to the second target as the migration destination target, and executes the registration change after migrating data.

14. A communication control method for a storage device, the storage device being adapted to be coupled to one or more host computers, a name server and another storage device, the one or more host computers searching for an alternate path when a defect is discovered in a path used for reading/writing data from/to the storage devices, the communication control method comprising:

causing to register a first target address identifying a first target to the name server, the first target communicating with the one or more host computers through a first port of the storage device;

migrating data from a migration source target to a migration destination target, ordering the migration destination target to reject new update instructions and reflect data updated during migration, changing the first target address, of the first target as the migration source target, registered in the name server to a second target address identifying a second target, as the migration destination target, of a second port of the another storage device, if data stored in the storage device is migrated to the another storage device, and disconnecting communications including a connection between the migration source target and the host computer, denying a re-connection request of the migration source target and rejecting a new login to the migration source target, for reading/writing data from/to the storage device, established by the one or more host computers with the first target as the migration source target, after changing the first target address to the second target address, wherein the change from the first target as the migration source target to the second target as the migration destination target occurs when a processing quantity of the first target as the migration source target has exceeded a value.

15. The communication control method according to claim 14, comprising:

causing to register an address of the first port of the storage device to the name server.

16. The communication control method according to claim 14, comprising:

migrating data from the first target as the migration source target to the second target as the migration destination target.

* * * * *